(12) United States Patent
Amagasaki (10) Patent No.: US 6,661,850 B1
(45) Date of Patent: Dec. 9, 2003

(54) TESTING SYSTEM OF VOICE-BAND DATA TRANSMISSION INTERFACE ON AN EXCHANGE

(75) Inventor: Hisashi Amagasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,421

(22) Filed: Oct. 8, 1998

(30) Foreign Application Priority Data

Oct. 16, 1997 (JP) .............................................. 9-284117

(51) Int. Cl.[7] .............................................. H04L 27/04
(52) U.S. Cl. ........................................ 375/309; 375/224
(58) Field of Search ................................ 375/219, 220, 375/242, 295, 224, 316, 362, 334, 356, 309

(56) References Cited

U.S. PATENT DOCUMENTS 5,377,260 A * 12/1994 Long ...................... 379/142.15

FOREIGN PATENT DOCUMENTS

| JP | 58-85654 | 5/1983 |
|---|---|---|
| JP | 60-77565 | 5/1985 |
| JP | 1-136454 | 5/1989 |
| JP | 4-165748 | 6/1992 |
| JP | 4-258061 | 9/1992 |
| JP | 9-36962 | 2/1997 |

* cited by examiner

*Primary Examiner*—Chi Pham
*Assistant Examiner*—Pankaj Kumar
(74) *Attorney, Agent, or Firm*—Katten Muchin Zavis Rosenman (57) ABSTRACT

According to the present invention, a maintenance operator can optionally or automatically test not only normality of a frequency shift keying (FSK) signal calling circuit but a specification, a transmission protocol and a standard of a signal length of FSK signal. An exchange system for transmitting information, such as a caller number, to a subscriber line circuit by employing a frequency shift keying signal, the exchange system comprising: a loop circuit for imitating a loop of a subscriber's telephone set; and a firmware for receiving a frequency shift keying signal and judging the normality of the frequency shift keying signal, wherein the firmware controls to open and close the loop circuit according to testing on On-Hook or Off-Hook protocol.

7 Claims, 13 Drawing Sheets

TESTING SYSTEM OF VOICE-BAND DATA TRANSMISSION INTERFACE ON AN EXCHANGE

BACKGROUND OF THE INVENTION

1. Field of the Invention

The present invention relates to a testing system on an exchange that subscriber line or exchange itself provide to attain self-test in the inside of a built-in test circuit. More particularly, it relates to a test system for a voice-band data transmission interface (VDTI).

2. Description of the Related Art

Voice band Data Transmission Interface (VDTI) is widely used in Japan or international market, mainly. It is possible even for analog subscriber to link to an attached Called Customer Premises Equipment (CPE) for displaying information of a subscriber who sends an outgoing call, such as a caller number, called date or an identifier on the equipment.

Figure 12:
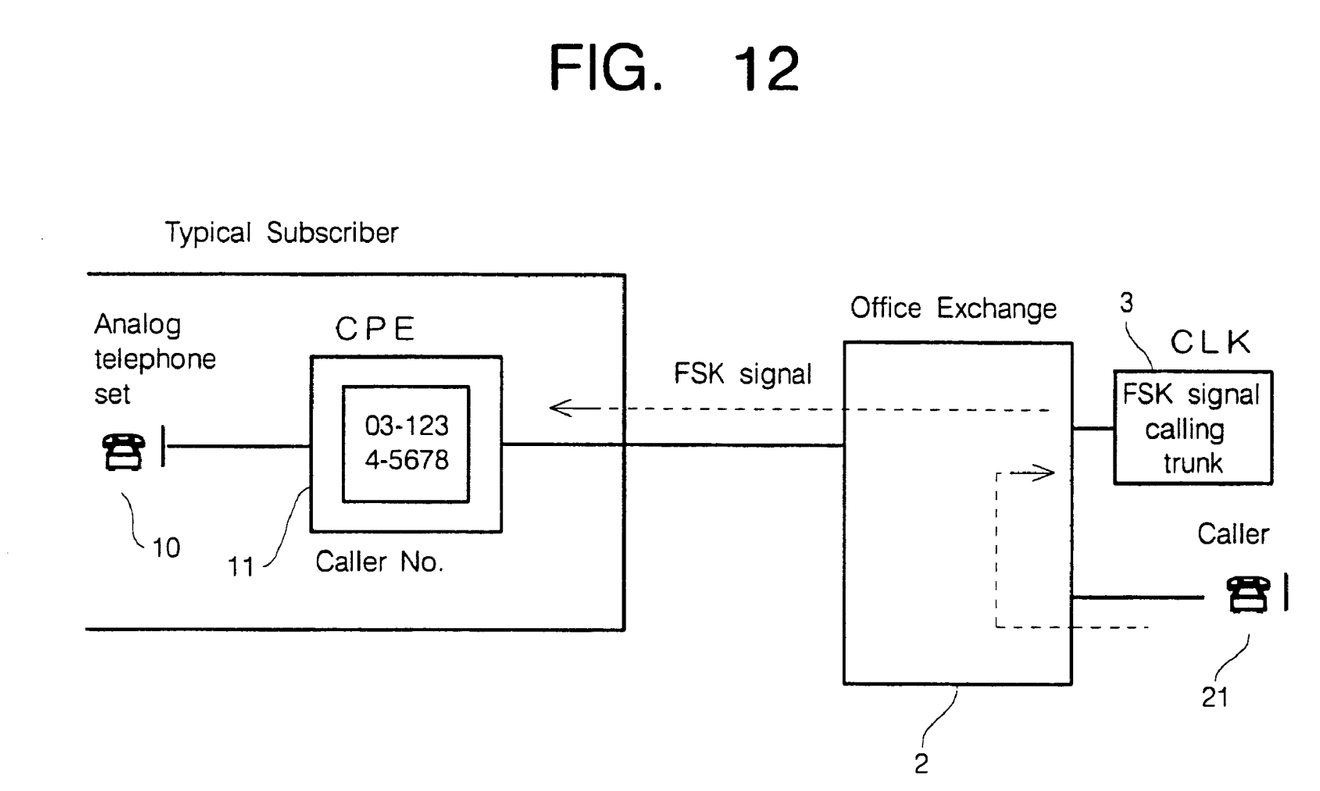
FIG. 12 is a block diagram illustrating an outline of a caller number displaying system employing VDTI.

As shown in a block diagram illustrating an outline of an outgoing call number displaying system employing VDTI in FIG. 12, information is transmitted between an analog telephone set 10, Called Customer premises Equipment (CPE) 11 and an network exchange 2 by a FSK (Frequency shift keying) signal. Caller information stored in network exchange 2 corresponding to caller 21 is modulated by a FSK (frequency shift keying) signal in a Called Line Identification (CLI) transmitter 3, which is a dedicated trunk. The modulated signal is transmitted to the subscriber, and is displayed on called customer premises equipment 11.

Service employing this caller number displaying function, such as a caller number informing system, has been brought by Nippon Telegram & Telephone Corporation (refer to Japanese laid open patent applications No. 4-165748 and 9-36962).

Figure 13A:
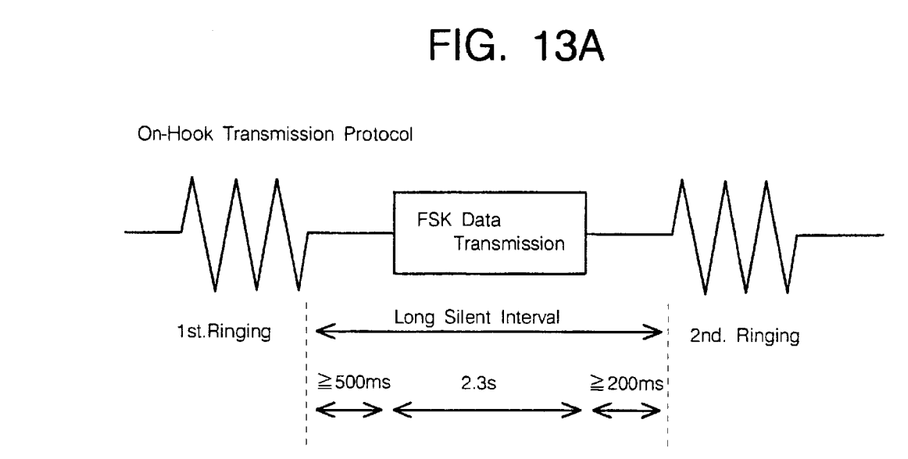
FIGS. 13A and 13B are diagrams showing an example of Bell-core recommendation of VDTI.
Figure 13B:
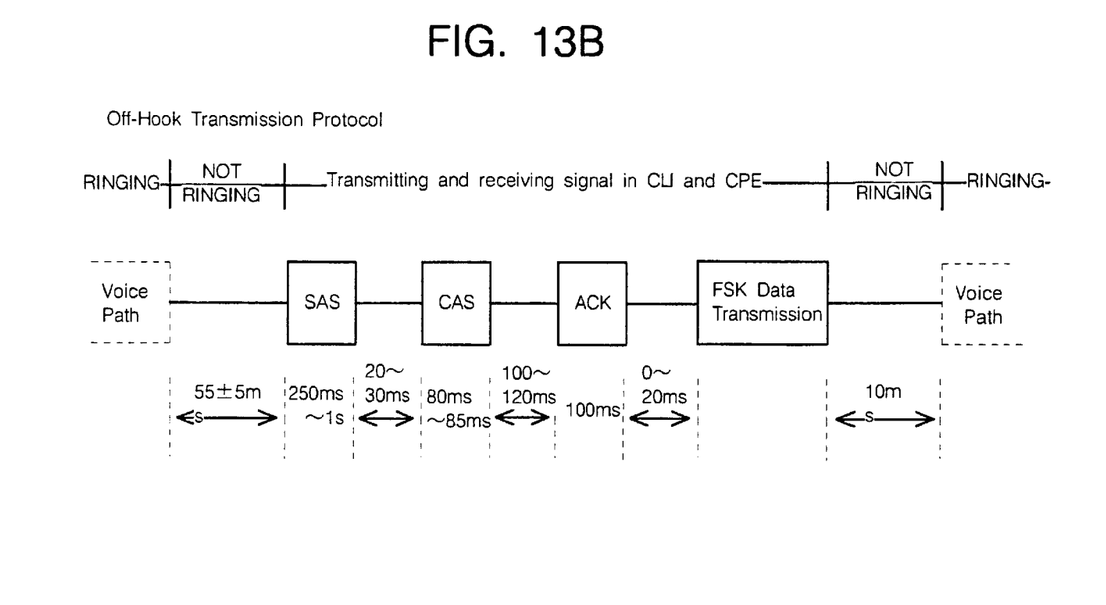

As an example of Bell-Core recommendations of FIGS. 13A and 13B, signal length or signal protocol is fully prescribed on VDTI. Therefore, it becomes difficult to provide a stable service on a nonstandard system.

FIG. 13A shows when a FSK signal is transmitted to the subscriber on On-Hook transmission status. Caller information is transmitted by a FSK signal for 2 or 3 seconds during a silent interval between a first ringing and a second ringing.

FIG. 13B shows when FSK signal is transmitted on an Off-Hook status. Off-hook means the subscriber disconnects a communication path once because FSK signal is transmitted while he is talking with other person. After procedures of a subscriber alerting signal (SAS), a CPE alerting signal (CAS) and an acknowledge signal (ACK) are executed between called line identification (CLI) transmitter 3, which is a FSK signal calling trunk, and called customer premises equipment (CPE) 11, a FSK signal is transmitted and the communication path is recovered.

Further, a FSK signal specification is prescribed in Bellcore recommendation as follows;

Modulation type: continuous-phase binary frequency shift keying

Logical 1 (Mark): 1200±12 Hz

Logical 0 (Space): 2200±22 Hz

Transmission Rate: 1200±12 baud

Application of data: serial, binary, asynchronous

Transmission level: −13.5±1 dBm

However, there are few techniques for testing normality of VDTI. Further, in the few techniques, only FSK signal modulation/demodulation circuit can be tested (for example, refer to Japanese laid open patent application No. 4-258061). By such the conventional techniques, only a closed section in Called line identification (CLI) transmitter 3, which is a FSK signal calling trunk, shown in FIG. 12, for example, the FSK modulation/demodulation circuit, could be tested. Therefore, it was only possible to test whether or not a FSK signal is present or what the output level is.

However, it is not enough for testing VDTI to test only the FSK modulation/demodulation circuit. There is required for testing VDTI with due regard to a transmission protocol on On-Hook or Off-Hook status. Further, the test should follow the standard of the signal length and data transmission.

Additionally, it is impossible to perform testing to cover widely range including communication paths in a network with regard to the protocol, in only a test of FSK signal modulation/demodulation circuit. Various devices are complicatedly controlled for currently-used service realized in an exchange.

There is a demand for testing not only each device but a network, communication paths and protocols in total. Further, there is a serious demand for realizing reliability of a system and supplying the service stably by automatically and regularly testing when there are many subscribers in a large-scaled network, such as an office exchange.

SUMMARY OF THE INVENTION

Therefore, it is an object of the present invention to provide a VDTI testing system on an exchange to achieve the above-described problem.

To attain the above-described problems, an exchange system for transmitting information, such as a caller number, to a subscriber line circuit by employing a frequency shift keying signal, the exchange system may include a loop circuit for imitating a loop of a subscriber's telephone set, and a firmware for receiving a frequency shift keying signal and judging the normality of the frequency shift keying signal, wherein the firmware controls to open and close the loop circuit according to testing on On-Hook or Off-Hook protocol.

Further, as a feature of the detailed structure, a testing system on a voice-band data transmission interface on an exchange comprising an exchange including a central processing unit, and a signal transmission device which is controlled to transmit a test starting signal by the central processing, a caller line identification transmitter for receiving the test starting signal to output a frequency shift keying (FSK) signal, and line test equipment including a loop circuit which receives the frequency shift keying signal sent from the caller line identification transmitter and which is controlled to open or close according to a notification of a test result on On-Hook or Off-Hook protocol for detecting sufficiency to fulfill On-Hook or Off-Hook protocol, for the received FSK signal.

Other objects of the present invention will become clear by the description for explaining embodiments according to the attached drawings.

DESCRIPTION OF THE PREFERRED EMBODIMENTS

Embodiments according to the present invention will be now explained in accompanying with the attached drawings. Throughout the following descriptions, the same reference numerals and symbols are used to denote and identify corresponding or identical components.

Figure 1:
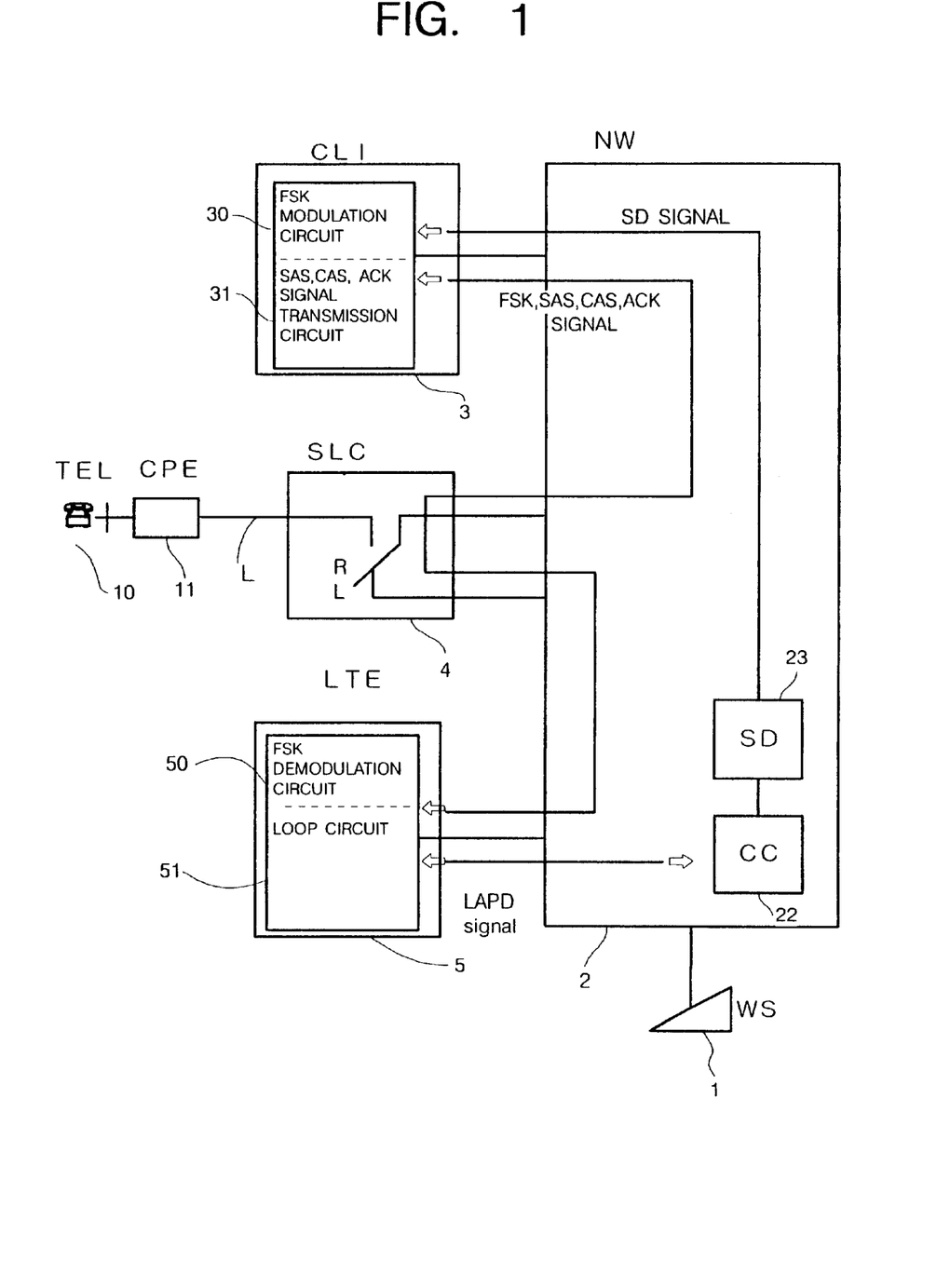
FIG. 1 shows a block diagram of a system structural example according to a first embodiment of the present invention.

FIG. 1 is a block diagram of a system structural example according to a first embodiment of the present invention. A central processing unit (CC) 22 activates a relay RL of a subscriber line circuit (SLC) 4 according to an instruction (command) sent from a maintenance operator using a work station (maintenance console) 1 to connect a line L on subscriber side to a network exchange (NW) 2 side.

Next, central processing unit 22 activates a signal delivery (SD) device 23 to transmit a SD signal to called line identification transmitter 3. Concurrently, central processing unit 22 also informs the test type showing On-hook or Off-hook status to line test equipment. FSK modulator 30 built-in called line identification transmitter 3, when started by the SD signal, modulates a FSK signal with the subscriber information and transmits the modulated signal.

On the other hand, line test equipment 5 opens or closes a spurious loop circuit 51 according to an instruction of the test type sent from central processing unit 22 and imitates a hook status of the subscriber's telephone set. The imitated status can be made because there are differences about transmission signals and timings between the On-hook and Off-hook statuses as shown in FIG. 13. Here, the test type is instructed according to a command sent by a maintenance operator through work station 1.

Central processing unit 22 supplies an alerting signal i.e., a ringing signal, on On-hook status and controls called line identification transmitter 3 as to transmit a FSK signal during a silent interval of the alerting signal. Central processing unit 22 further controls called line identification transmitter 3 as to transmit the FSK signal after signal answering/response according to the Off-hook transmission protocol is finished between called line identification transmitter 3 and line test equipment 5.

FSK signal demodulator 50 in line test equipment 5 receives a FSK signal via subscriber line circuit 4 and network exchange 2. A firmware built-in line test equipment 5, not shown in the diagram, checks whether or not a series of protocols of the alerting signal, a special signal on Off-hook status, a signal standard of the FSK signal and timings are normal, and the line test equipment 5 notifies the result to central processing unit 22.

In this way, according to the present invention, it becomes possible to imitate the On-hook and OFF-hook statuses of subscriber telephone set by providing spurious loop circuit 51 on line test equipment 5 for testing with taking the FSK signal in. Therefore, there is no need that a real subscriber operates a telephone set, and it becomes possible to easily test the transmission protocol of the FSK signal.

In addition, it can be realized to perform testing whether or not received signals have satisfied protocols and standards are executed by a firmware built in a line test equipment 5, at low cost without employing any complex testing device. According to the embodiment shown in FIG. 1, the line test system can be constructed. This construction can make it possible to perform testing nearer at the subscriber, it is more preferable structure.

Figure 2:
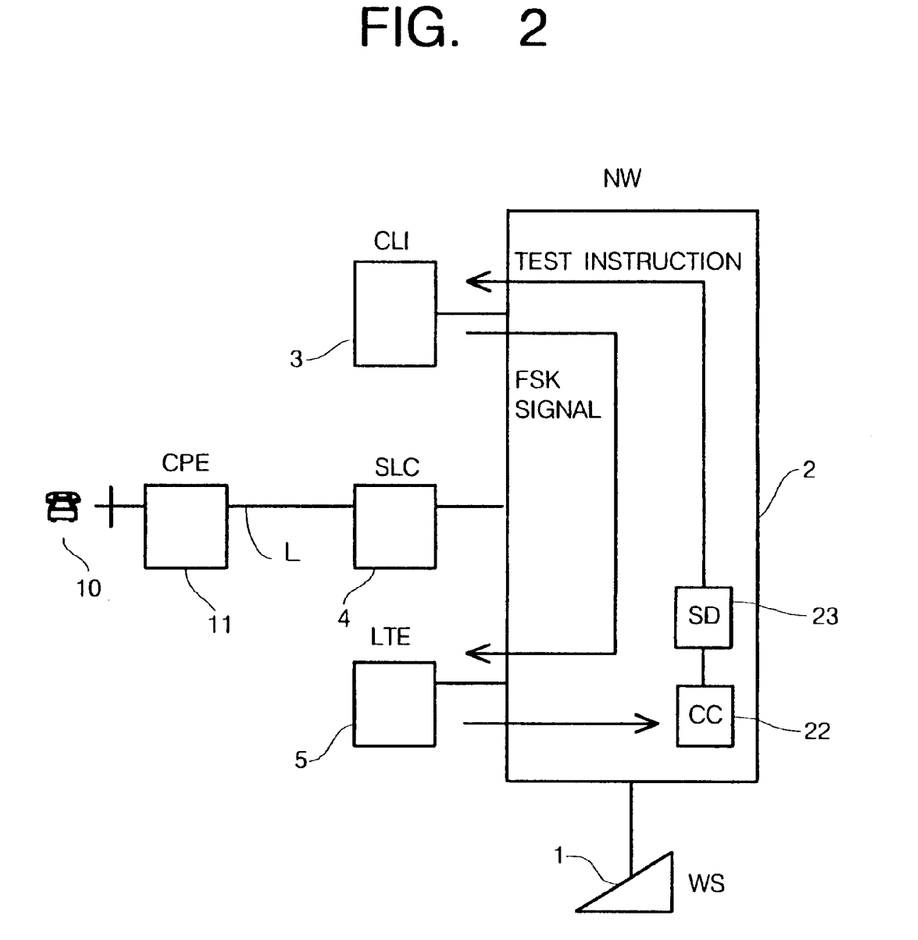
FIG. 2 shows a block diagram of an example according to other embodiment of the present invention.
Figure 3:
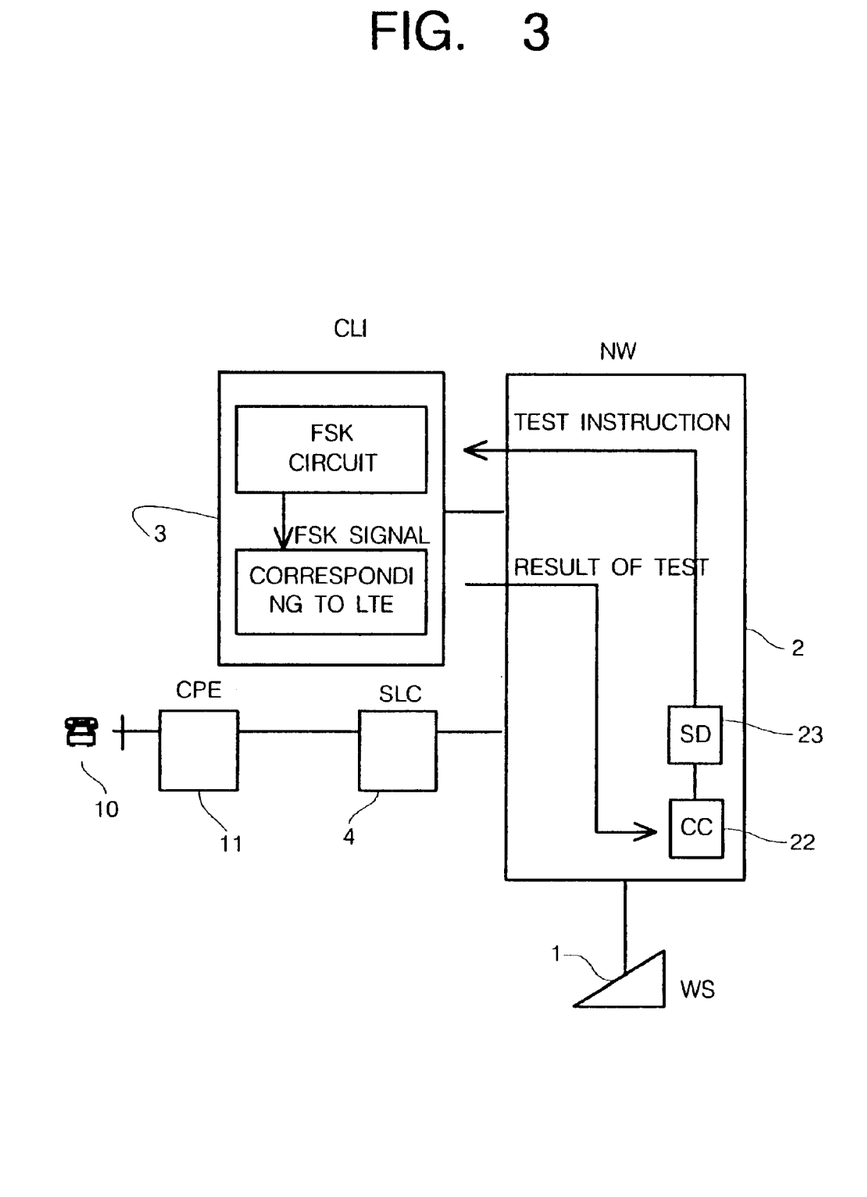
FIG. 3 further shows a block diagram of an example according to other embodiment of the present invention.

FIGS. 2 and 3 are block diagrams according to other embodiment of the present invention. In a structure shown in FIG. 2, a FSK signal is directly inputted to line test equipment 5, not through subscriber line circuit 4.

In the structure shown in FIG. 3, subscriber line circuit 4 is disconnected from the network exchange 2. That is, a circuit having a test function same as that of line test equipment 5 is provided on called line identification transmitter 3 so as to directly transmit the result of the test to central processing unit 22.

Figure 4:
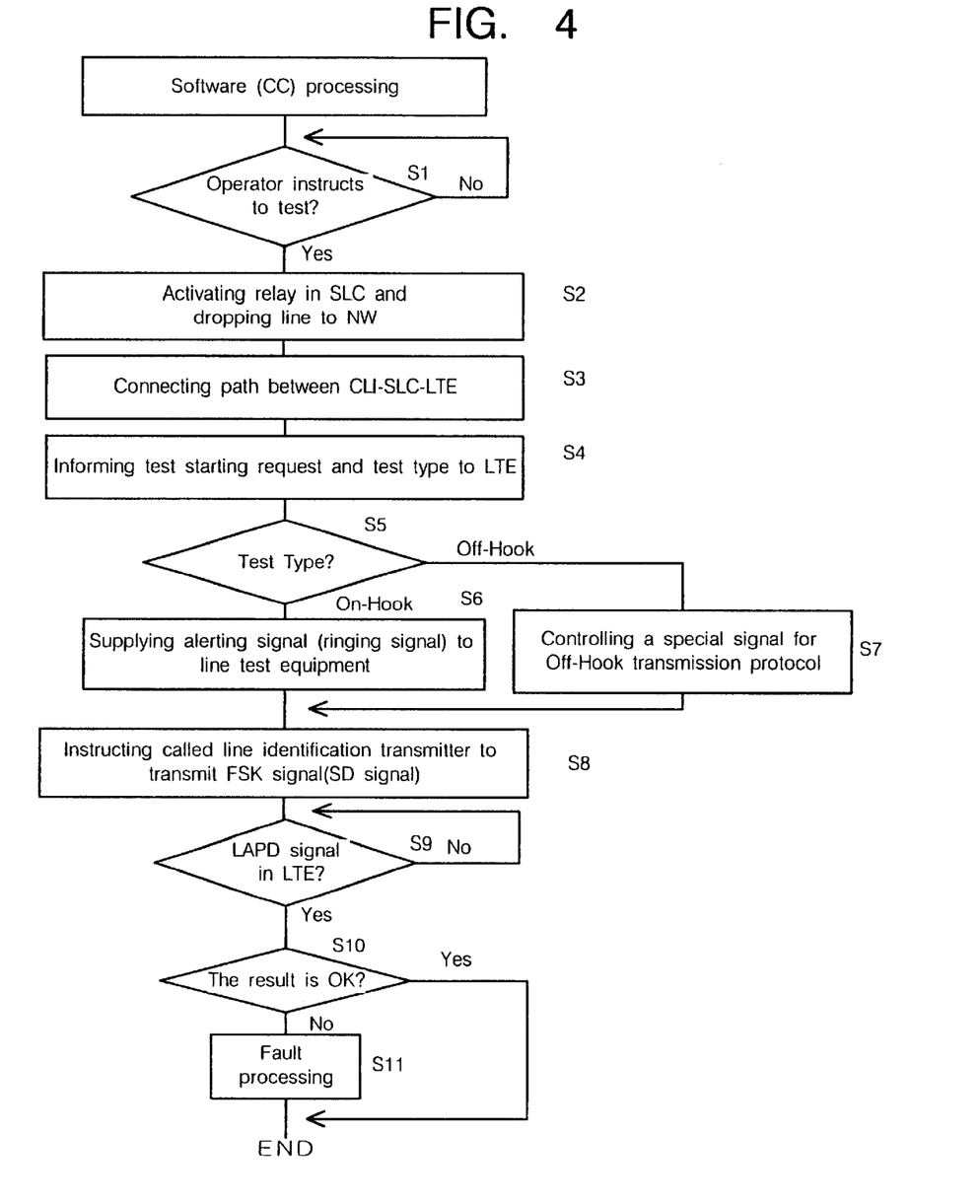
FIG. 4 is a diagram illustrating an example for controlling a software on a central processing unit 22.

Next, an example of a software control provided on central processing unit 22 is shown in FIG. 4. Further, examples of the firmwares of called line identification transmitter 3 and line test equipment 5 are respectively shown in FIGS. 5 and 6. FIG. 7 illustrates a sequence flowing chart between central processing unit 22, called line identification transmitter 3 and line test equipment 5. The contents of the above-described software control in FIG. 4 and contents of the firmwares shown in FIGS. 5 and 6 will be explained with the sequence flowing chart shown in FIG. 7 as follows;

In FIG. 4, central processing unit 22 monitors whether or not there is a test instruction sent from an operator (maintenance person) (STEP Si). The test instruction is inputted by the operator from a work station 1 attached to network exchange 2. If the test instruction is sent from the operator, central processing unit 22 activates a relay RL in subscriber line circuit 4 and drops a line L to network exchange 2 (STEP S2). Thereby, the path between CLI-SLC-LTE can be set (STEP S3: STEP.SS1 of the sequence flowing chart shown in FIG. 7).

Next, the unit 22 informs the test starting request and the test type (STEP S4: STEPs SS2 and SS3 of the FIG. 7). After the firmware in line test equipment 5 receives the test starting request from central processing unit 22, the firmware opens or closes built-in loop circuit 51 according to the test type (On-hook or Off-hook status) (STES SS4: refer to FIG. 7). A response to the test starting request is sent from line test equipment 5 to central processing unit 22 according to the releasing or closing (STEP SS5: refer to FIG. 7). This operation makes unnecessary to distinguish whether line test equipment 5 is used for testing or is used in real operation.

Next, the test type is judged by the software of central processing unit 22 (STEP S5). If the type is On-hook protocol, the alerting signal, i.e., a ringing signal, is supplied to the subscriber (to line test equipment 5, actually) (STEP S6: STEP SS6 of FIG. 7). If the type is an Off-hook protocol, called line identification (CLI) transmitter 3 transmits a special signal, such as a SAS or CAS signal to line test equipment 5 (STEP S7). In addition, if line test equipment 5 receives the special signal, it transmits an ACK signal to called line identification transmitter 3 (STEP SS7 of FIG. 7).

On the other hand, central processing unit 22 instructs called line identification transmitter 3 to transmit FSK signal (STEP S8: STEP SS8 of FIG. 7), and called line identification transmitter 3 transmits a FSK signal to line test equipment 5 (STEP SS9: FIG. 7).

As explained above, the series of signal transmission timings are administrated and controlled by the software. Line test equipment 5 judges whether or not all of the level, the existence of signals, timings and the difference of protocols about the series of the received signals follow the correct standards, and the result of the testing to the software is informed by a link access procedure signal on the D channel (STEP SS10: FIG. 7).

It is possible to inform various information about abnormal status of the signal level, the timing, the protocol or the like on this step.

Accordingly, as shown in FIG. 4, central processing unit 22 judges whether or not the LAPD signal sent from line test equipment 5 is present by the software (STEP S9). If the LAPD signal exists, it is judged whether or not the result of the test is good or not (STEP S10). If a failure occurs, the unit 22 performs a recovery processing for the failure (STEP S11).

Figure 5:
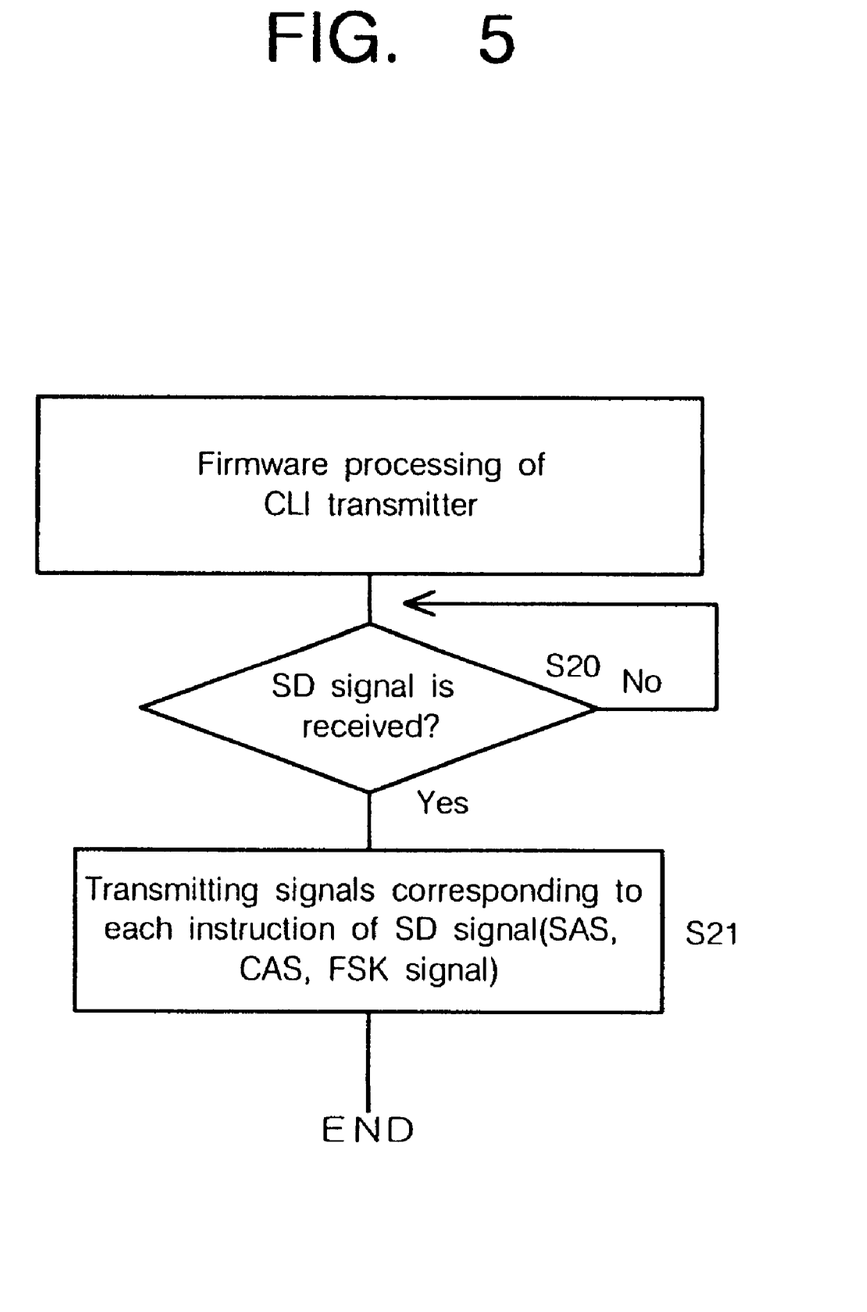
FIG. 5 is a flow chart for firmware processing of a subscriber information transmitter 3.

FIG. 5 shows an operational flowing chart of the firmware in called line identification transmitter 3. When called line identification transmitter 3 receives a SD signal sent from the signal transmitter 23 (STEP S20), it transmits signals (SAS, CAS, FSK) to line test equipment 5 according to each instruction from the SD signal (STEP S21).

Figure 6:
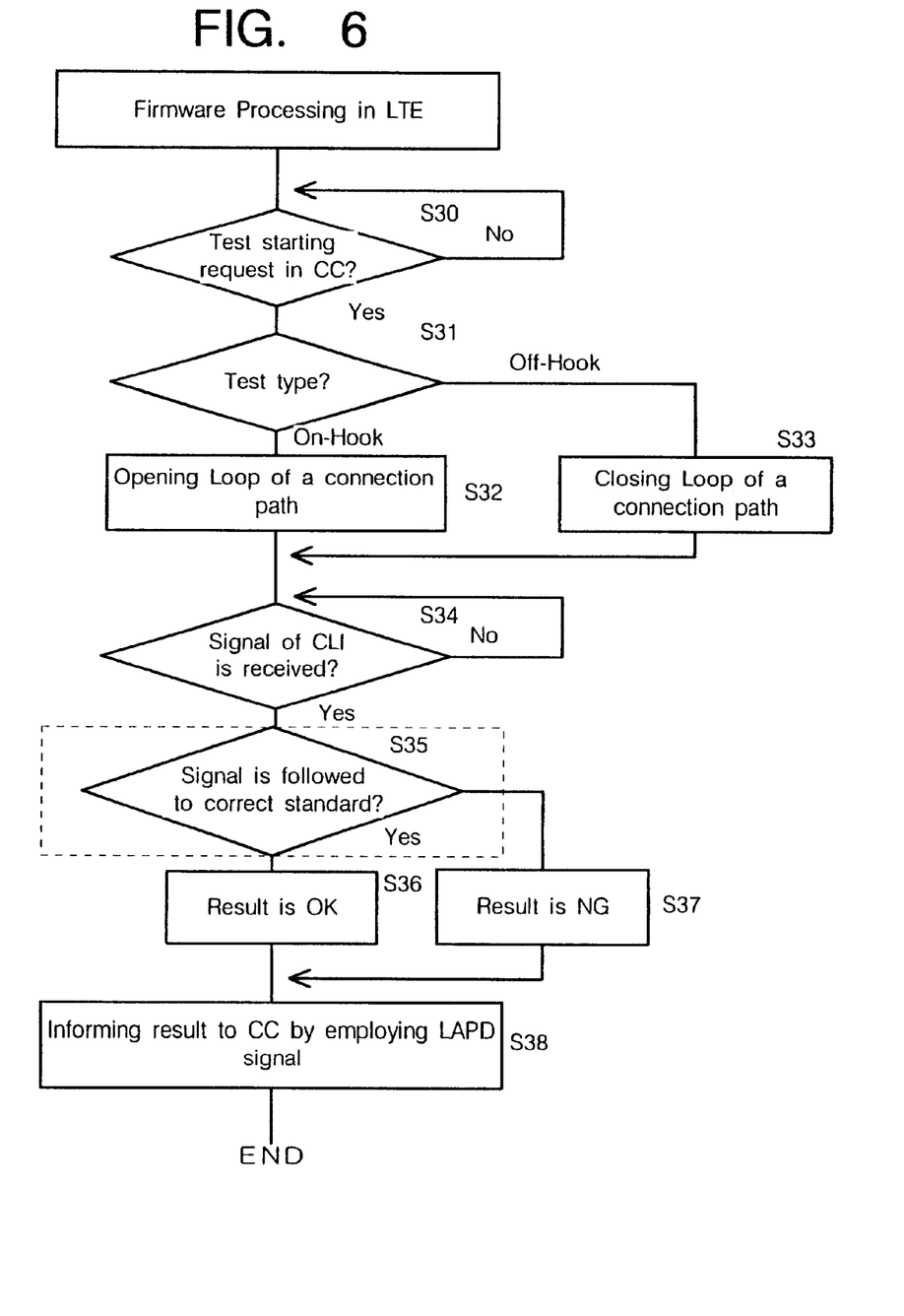
FIG. 6 shows contents of firmware processing on line test equipment.
Figure 7:
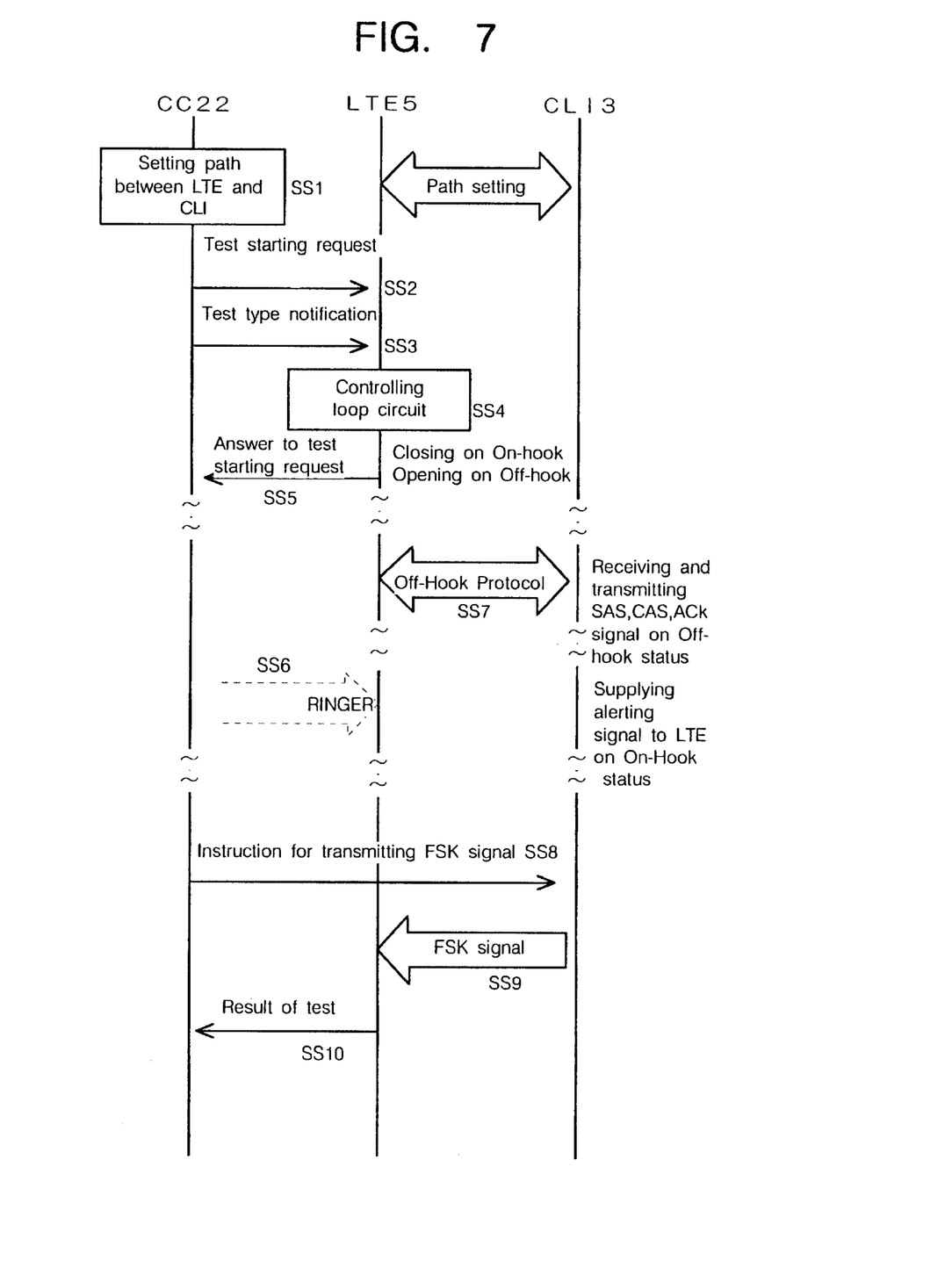
FIG. 7 is a sequence flowing chart between central processing unit 22 and called line identification transmitter 3 and a line test equipment 5.

FIG. 6 shows contents of the firmware processing in line test equipment 5. Line test equipment 5 judges the existence of a test starting request sent from central processing unit 22 (STEP S30). If there is a test starting request, it is judged whether the test is executed on an On-Hook status or an Off-Hook status (STEP S31).

If the test is executed on the On-Hook status, a loop of the connection path is opened (STEP S32). If it is executed on the Off-Hook status, the loop of the connection path is closed (STEP S33).

Next, line test equipment 5 judges the existence of a signal sent from called line identification transmitter 3 (STEP S34), and judges whether or not the signal is correct (STEP S35). Procedures of this judgement will be explained later in detail.

The result OK (STEP S36) or NG (STEP S7) can be obtained from the judgement, and it is informed to central processing unit 22 (STEP S38: refer to STEP SS10 FIG. 7).

Figure 8:
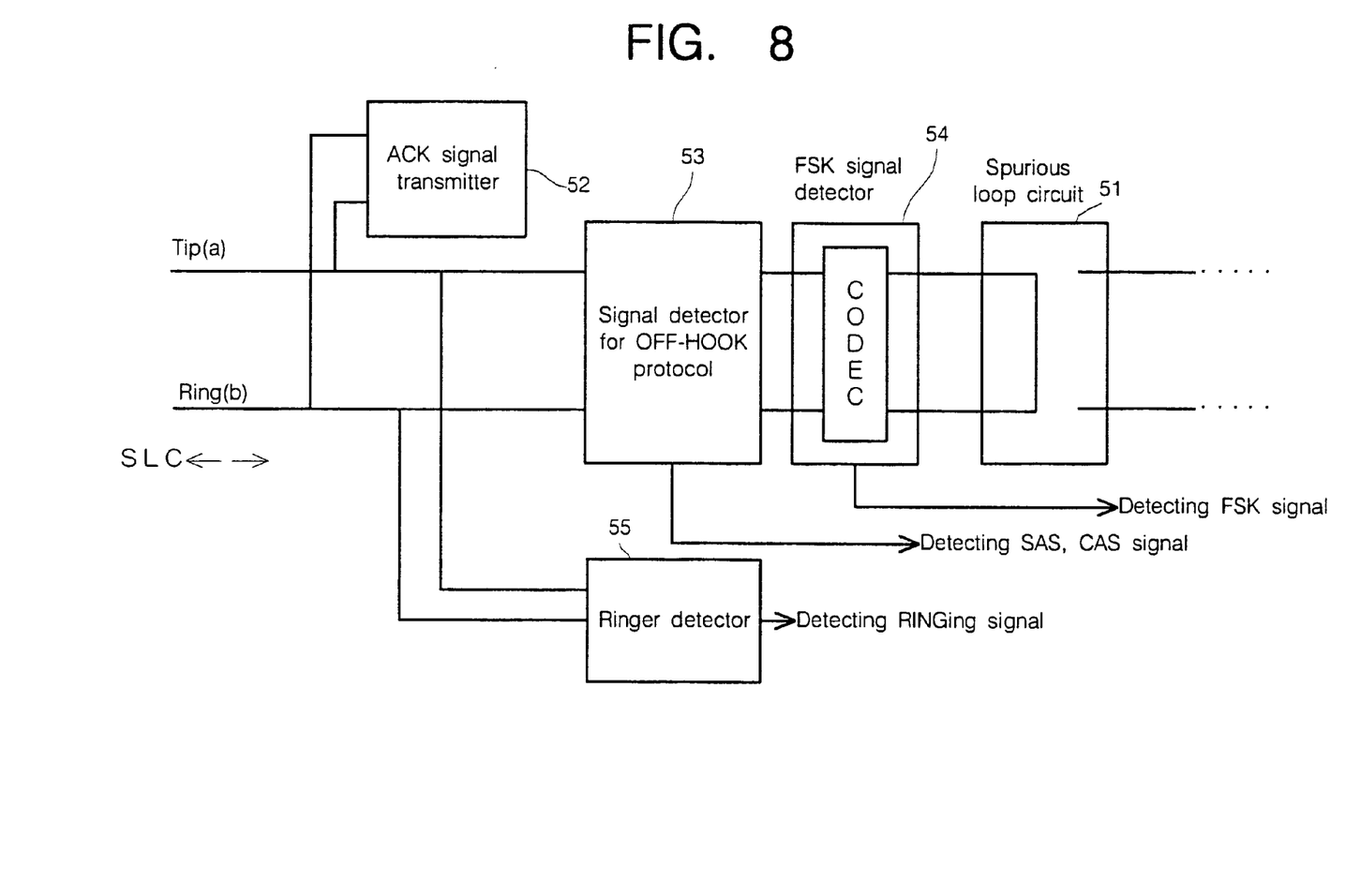
FIG. 8 is a block diagram of a structural example of a test circuit forming line test equipment of VDTI test system on the exchange according to the present invention.

FIG. 8 is a block diagram of a structural example of the testing circuit constructing line test equipment 5 for VDTI test system in the network exchange 2 according to the present invention.

The testing circuit includes an acknowledge (ACK) signal transmitter 52, a ringer detector 55, a signal detector for Off-Hook protocol 53, a decoder 54 and a loop imitating circuit 51. The signal detector for Off-Hook protocol 53 detects SAS and CAS signals. Further, the decoder 54 detects a FSK signal. The testing circuit executes required controls according to SAS and CAS signals and the FSK signal detected by the use of the firmware, not shown in FIG. 8.

Figure 9:
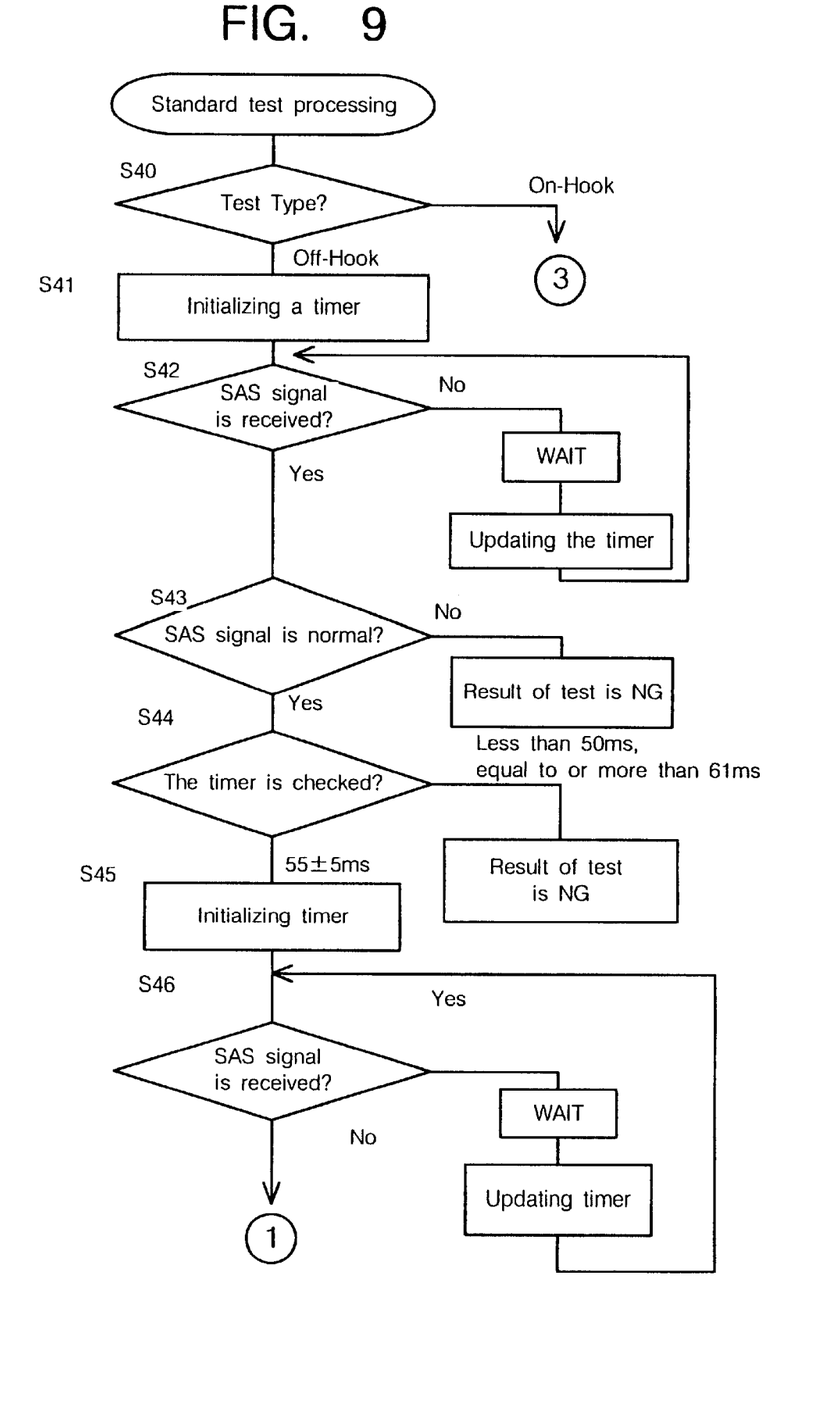
FIG. 9 is a first flowing chart of a standard signal test on line test equipment, and shows a processing on STEP S35 shown of FIG. 6 in detail.
Figure 10:
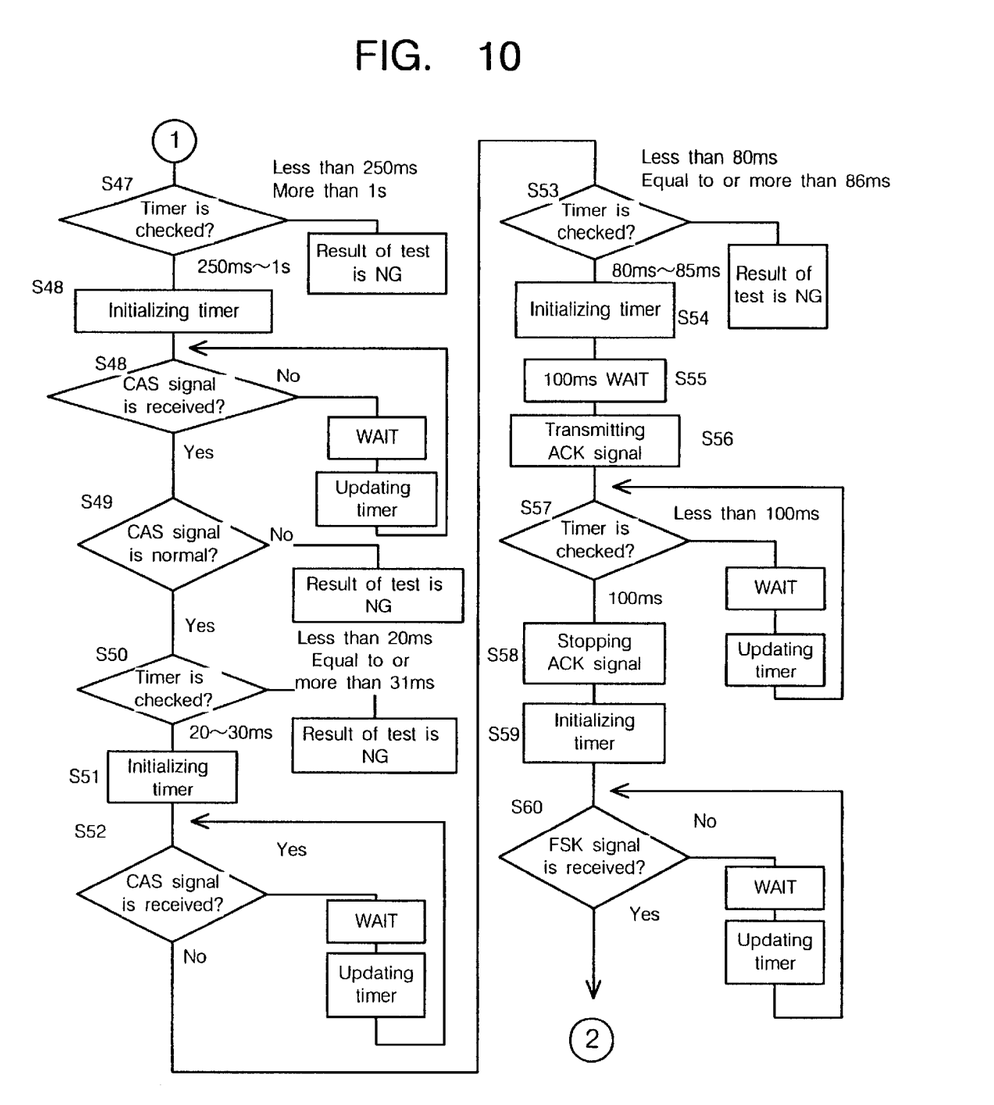
FIG. 10 is a second flowing chart of a standard signal test on line test equipment, and shows a processing on STEP S35 of FIG. 6 in detail.
Figure 11:
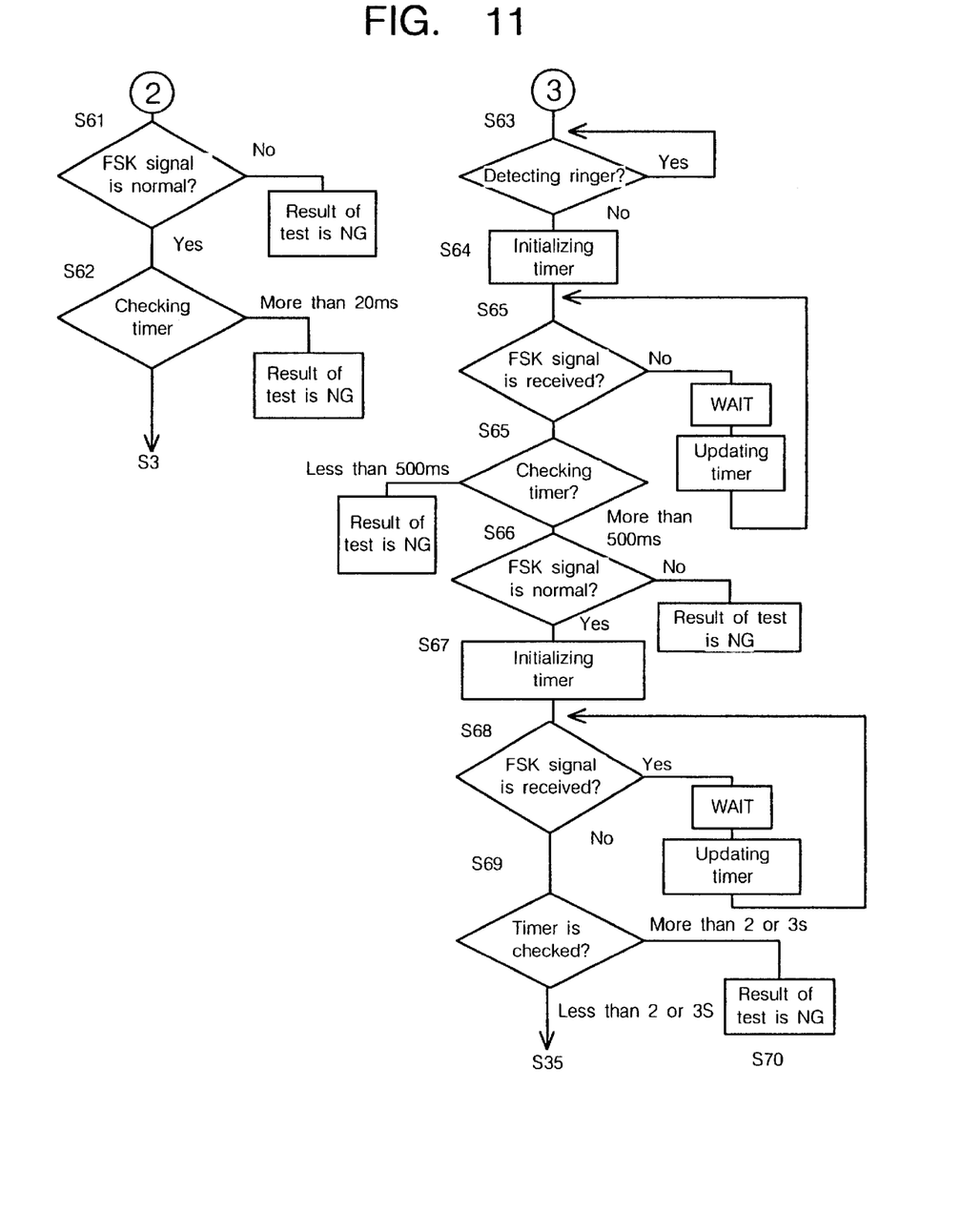
FIG. 11 is a third flowing chart of a standard signal test on line test equipment, and shows a processing on STEP S35 of FIG. 6 in detail.

Further, FIGS. 9 through 11 are operational flowing charts for testing of standard signals in line test equipment 5. Those charts show the processing on STEP S35 of FIG. 6 in detail. The standard signal testing is performed to check whether or not signals fulfill the protocol explained in FIGS. 13A and 13B.

At first, the test type is judged (STEP S40). If the test type is for OFF-Hook status, it is judged whether or not the signals fulfill the standard shown in FIG. 13B. A timer is initialized (STEP S41), and then, the SAS signal is received to test its normality (STEP S43).

Additionally, it is judged whether or not the interval to receive the SAS signal is within 55±5 ms (STEP S44). Then, the timer is initialized again (STEP S45), the SAS signal is received (STEP S46), and a period of duration is measured (STEP S47). Here, it is detected that the period of duration is between 250 ms and 1s.

After that, the timer is initialized (STEP S48), and then, the CAS signal is received (STEP S48), similarly to the test of the SAS signal, to judge the normality of the CAS signal (SEP S49), and the interval to receive CAS signal is measured (STEP S50). If the interval is between 20 ms and 30 ms, the CAS signal follows the standard. The timer is initialized again (STEP S51), and a period of duration of the CAS signal is measured (STEP S53). If the measured value is between 80 ms and 85 ms, the CAS signal follows the standard.

Then, the timer is initialized (STEP S54). After elapsing 100 ms (STEP S55), an ACK signal is continuously transmitted (STEP S56). After that, when the ACK signal is transmitted for 100 ms (STEP S57), the ACK signal is stopped (STEP S58).

Then, the timer is initialized (STEP S59), it is confirmed the FSK signal is received (STEP S60). In here, the normality is judged (STEP S61), and it is judged whether or not the signal is received within 20 ms (STEP S62).

It is judged whether or not those signals follow the standard of transmission protocol (refer to FIG. 13B) on the Off-Hook status on the above-described steps S40 through S62. As the result, it can be obtained that the result is good OK (STEP S36) or not good NG (STEP S37), respectively shown in FIG. 6.

In here, when the test type is judged as On-Hook status on the step S40 of FIG. 9 (STEP S40), the standard test shown in FIG. 13A is executed as follows;

If the line is not on ringing (STEP S63), the timer is initialized (STEP S64). Then, the FSK signal is received (STEP S65). If the interval to receive the signal is less than 500 ms, the result is not good (NG) (STEP S66). If the interval to receive the signal is equal to or more than 500 ms, the normality of a FSK signal received next is judged (STEP S66).

If it is normal, the timer is initialized (STEP S67), the FSK signal is received (STEP S68), and a period of duration of the FSK signal is measured (STEP S69). That is, it is judged whether or not the interval to receive the FSK signal is less than 2.3 ms. If the interval to receive the FSK signal is equal to or more than 2.3 ms, the result is not good (NG) (STEP S70).

After the standard test on On-Hook status is finished, the processing continues to STEP S36 or S37 of FIG. 6, simultaneously.

As explained according to the embodiments, it becomes possible to test not only the normality of a FSK signal transmitter but the specification of the FSK signal, transmission protocol and a standard of the signal length, optionally or automatically by the maintenance operator according to the present invention, and therefore, it becomes possible to realize good quality of the system and the service, detect faults early, and supply service stably.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An interface testing system for use in transmitting data within a voice band, the interface testing system comprising:

an exchange for transmitting information including a caller number to a subscriber line circuit, to which customer premise equipment is connected through a telephone line;

a caller line identification transmitter provided in the exchange for transmitting a frequency shift keying signal which is modulated with the transmission information including a caller number;

a loop circuit attached to the exchange for turning back the frequency shift keying signal output from the caller line identification transmitter so as to imitate a loop of a subscriber's telephone set, which is connected to the customer premise equipment; and a firmware provided in the exchange for receiving a the frequency shift keying signal turned back from the loop circuit and controlling to open and close the loop circuit according to testing of an On-Hook or Off-Hook protocol to judge the normality of the frequency shift keying signal.

2. The testing system according to claim 1, wherein said caller line identification transmitter continuously sends out said frequency shift keying signal for a predetermined time period between a first ringing and a second ringing on testing of the On-Hook protocol.

3. The testing system according to claim 1, wherein said caller line identification transmitter transmits the FSK signal to said line test equipment after receiving and transmitting special signals from and to said line test equipment on testing of the Off-Hook protocol.

4. The testing system according to claim 3, wherein said special signals comprise a signal for calling a subscriber, a signal for calling called customer premises equipment (CPE), and response signals for those signals.

5. The testing system according to claim 1, wherein said notification of the testing of the On-Hook or Off-Hook protocol sent from said central processing unit to said line test equipment and said notification of the result of the testing in said line test equipment to said central processing unit are executed using a link access procedure, D channel (LAPD) protocol.

6. An interface testing system for use in transmitting data within a voice-band, the interface testing system comprising:

an exchange for transmitting information including a caller number;

a called line identification transmitter provided in the exchange for transmitting a frequency shift keying signal, which is modulated with the transmitting information including a caller number;

a subscriber circuit including a circuit attached to the exchange for turning back the frequency shift keying signal output from the called line identification transmitter; and test equipment attached to the exchange for receiving the frequency shift keying signal turned back by the turning back circuit and for performing testing of whether or not the frequency shift keying signal follows protocols of On-Hook or Off-Hook status.

7. The testing system according to claim 6, wherein said turning back circuit is formed with a relay circuit.

* * * * *